(12) United States Patent
Laycock et al.

(10) Patent No.: US 11,169,508 B2
(45) Date of Patent: Nov. 9, 2021

(54) CONTEXTUAL ANALYTICS MAPPING

(71) Applicant: HONEYWELL INTERNATIONAL INC., Morris Plains, NJ (US)

(72) Inventors: Graeme Laycock, Hunters Hill (AU); Mark Bertinetti, East Killara (AU); Rahul Nath, Redfern (AU)

(73) Assignee: Honeywell International Inc., Charlotte, NC (US)

(*) Notice: Subject to any disclaimer, the term of this patent is extended or adjusted under 35 U.S.C. 154(b) by 164 days.

(21) Appl. No.: 16/577,853

(22) Filed: Sep. 20, 2019

(65) Prior Publication Data
US 2020/0103871 A1 Apr. 2, 2020

Related U.S. Application Data

(60) Provisional application No. 62/739,005, filed on Sep. 28, 2018.

(51) Int. Cl.
*G05B 19/418* (2006.01)

(52) U.S. Cl.
CPC ............... *G05B 19/41835* (2013.01); *G05B 2219/31284* (2013.01); *G05B 2219/37591* (2013.01)

(58) Field of Classification Search
CPC .... G05B 19/41835; G05B 2219/37591; G05B 2219/31284; G05B 2219/31483; G05B 23/0294; Y02P 90/30; G06Q 50/04; G06Q 10/0639
See application file for complete search history.

(56) References Cited

U.S. PATENT DOCUMENTS

| | | | |
|---|---|---|---|
| 2004/0186927 A1* | 9/2004 | Eryurek | G06Q 10/063 710/12 |
| 2007/0168057 A1 | 7/2007 | Blevins et al. | |
| 2011/0106277 A1 | 5/2011 | Sayyar-Rodsari et al. | |
| 2016/0300475 A1* | 10/2016 | Childs | G08B 25/00 |

\* cited by examiner

*Primary Examiner* — Christopher E. Everett
(74) *Attorney, Agent, or Firm* — Jetter & Associates, P.A.; Neil R. Jetter

(57) ABSTRACT

A computing system for receiving operational data including process parameters generated by sensors in a plant. An analysis engine uses the operational data to automatically provide a first listing of worst performing process parameters, that when a selected poor performing process parameter is chosen generates a ranked filtered view of equipment parameters for associated processing equipment that may be affected by the selected poor performing parameter and a filtered view of recommendations for recognizing action(s) to fix the associated processing equipment and/or the selected poor performing process parameter, and/or a second listing of worst performing processing equipment that when a selected poor performing processing equipment is chosen generates a ranked filtered view of suspected process parameters that may be affected by the selected poor performing processing equipment along with a filtered view of recommendations for recognizing action(s) to fix the selected poor performing processing equipment and the suspected process parameters.

16 Claims, 8 Drawing Sheets

CONTEXTUAL ANALYTICS MAPPING

CROSS REFERENCE TO RELATED APPLICATIONS

This application claims the benefit of Provisional Application Ser. No. 62/739,005 entitled "CONTEXTUAL ANALYTICS MAPPING," filed Sep. 28, 2018, which is herein incorporated by reference in its entirety.

FIELD

This Disclosure is related to a method and system for managing the operations of a plant, and more particularly to a method for determining enhanced plant operation conditions based on an analysis of the plant operations.

SUMMARY

The following Summary presents a simplified summary of certain features. The Summary is not an extensive overview and is not intended to identify key or critical elements.

A plant or refinery may, in the process of producing a product such as a product gas, be configured to monitor operational data corresponding to the operation of the plant. As used herein a "plant" includes processing equipment and field devices such as sensors and actuators that is configured to run an industrial process involving a tangible material that disclosed embodiments apply. For example, oil and gas, chemical, beverage, pharmaceutical, pulp and paper manufacturing, petroleum processes, electrical, and water. A plant is distinct from a data processing system that only performs data manipulations.

The operational data may comprise operational details of the production process, such as the health of a catalyst or the flow rate of fuel to a burner. Such operational data may comprise information associated with assets such as processing equipment of the plant, such as a flow rate of fuel to a burner, whether a pump is malfunctioning, or the like. Such operational data may comprise a profitability of the plant or refinery, such as a dollar value associated with current costs and output of the plant or refinery. Such operational data may comprise workforce information, such as the availability or activity of employees. Other operational data may relate to the performance of an automation system controlling production at the plant, the performance of safety systems and processes, and/or the state and performance of cybersecurity aspects of production.

The operational data may indicate that the plant or refinery is operating sub-optimally. For example, cybersecurity information may suggest that one or more computing devices at the plant do not have required software upgrades and are therefore potentially vulnerable to data exfiltration. As another example, a pipe carrying fuel for a burner may be clogged, reducing the flow rate of fuel to a burner and therefore the heat produced by the burner. As yet another example, control systems may be undesirably constrained and/or configured to generate an undesirable quantity of alarms, suggesting problems associated with process variables used by the control systems. Such information may comprise warnings or alarms, such as an alarm that a particular portion of a plant is on fire.

Disclosed aspects recognize the volume, speed, and complexity of plant operation data may make it difficult to collect it, synthesize it, and act upon it. While individual warnings or alarms (e.g., a pipe being clogged) may be detected and then acted upon, interrelations between different warnings or alarms may be difficult to identify and remedy. For example, a worker may be tardy on a given day and as a result fail to perform an early morning maintenance task, causing excessive vibration in a plant asset, which may impact the efficiency of production of the product, thereby ultimately causing a plant to perform sub-optimally. The presence of multiple warnings or alarms may suggest a common fault or problem that may not be obvious if each warning or alarm is remedied individually. In some cases, individual remediation of alarms or warnings may result in problems associated with other alarms or warnings becoming worse.

Disclosed aspects include methods, computing devices, and systems for collecting plant operational data, analyzing the plant operational data, determining tasks based on the analysis, and implementing such tasks (e.g., automatically adjusting plant processing equipment operating parameters). An analysis engine receives, from one or more devices in a plant, operational data. The operational data may comprise one or more alarms or warnings. The operational data may comprise information regarding plant profit and/or loss, equipment, chemical processes, workforce performance, automation system performance, safety system performance, and/or cybersecurity performance. The analysis engine analyzes the operational data to determine, e.g., one or more correlations. For example, the analysis engine may determine a root cause of a problem associated with the operational data being outside a specification.

The analysis engine may determine, for all or portions of the operational data, a confidence level, an importance level, and/or the like. The analysis engine may determine, based on the operational data, one or more tasks. The tasks may be configured to improve all or portions of the operational data, such as remediating one or more alarms or warnings. The tasks may involve replacement and/or shutdown of all or portions of the plant. The analysis engine may be configured to transmit, to a computing device, an indication of the task. For example, the analysis engine may transmit an instruction associated with a task to a mobile device of a plant engineer, and/or may transmit instructions to a plant control device and cause the plant control device to perform an action corresponding to a task. For example, the plant control device may automatically cause an adjustment to a flow rate, a pressure, a temperature, a valve, or the like.

Disclosed aspects also include a method of contextual analytics mapping that includes a first computing system receiving operational data including process parameters generated by sensors in a plant that includes controllers, and field devices comprising the sensors and actuators coupled to processing equipment, where the processing equipment is configured and controlled to run a controlled process. The operational data is used to providing at least one of:

1. a first listing of worst performing ones of the process parameters (e.g., with the top ranked process parameter problem based on a deviation from a model of the plant and excursions of limits or from machine learning of past actions) that when a selected poor performing one of the process parameters is chosen by a user from the first listing generates a ranked filtered view of equipment parameters for associated ones of the processing equipment that may be affected by the selected poor performing process parameters along with a filtered view of first recommendations for aiding the user to recognize what action to do in order to fix at least one of the associated ones of the processing equipment and the selected poor performing process parameter (e.g., to return their plant to an optimal state of production).

2. a second listing of worst performing ones of the processing equipment (e.g., with the top ranked processing equipment parameter problem based on a deviation from the model, excursions of limits, or change in processing equipment health or from machine learning of past actions) that when a selected poor performing one of the processing equipment is chosen by the user generates a ranked filtered view of suspected ones of the process parameters that may be affected by the selected poor performing processing equipment along with a filtered view of second recommendations for aiding the user to recognize what action to do in order to fix the selected poor performing processing equipment and at least one of the suspected ones of the process parameters (e.g., to return the plant to an optimal state of production).

The first listing and the second listing can both further comprise a visualization on a display device associated with the first computing system of a monetary opportunity that addressing the selected poor performing one of the process parameters or the selected poor performing one of the processing equipment would save. The first and second recommendations can both be ranked recommendations based on the combination of opportunity, priority and safety or risk for the plant, where after receiving approval to implement a selected recommendation comprising at least one of the first recommendations from the ranked recommendations of the first recommendations or a second recommendation from the rank recommendations of the second recommendations, a command can be sent configured to cause a task to be performed for implementing the selected recommendation. The method can further comprise the user of the first computing system entering comments including the selected poor performing one of the process parameters or the selected poor performing one of the processing equipment, the task, and a perceived effectiveness of the task in solving the selected poor performing one of the process parameters or the selected poor performing one of the processing equipment.

The operational data can include real-time data, and method can be performed by the first computing system in real-time. The plant can be configured to generate at least one tangible product or implement a power application.

The first computing system can include a specialized contextual analytics mapping module that utilizes a fault tree which stores cross-linking information regarding relationships between the first listing, the second listing, and associated ones of the first recommendations and the second recommendations. The fault tree provides more actionable insight into the problems at the plant, and allows the user to identify what issues they have and what to do about them significantly faster.

BRIEF DESCRIPTION OF DRAWINGS

This Disclosure is illustrated by way of example and not limited in the accompanying figures are not necessarily drawn to scale, and in which like reference numerals indicate similar elements and in which:

FIGS. 6A and 6B depict illustrative graphical user interfaces in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Chemical Plants and Catalysts

As a general introduction, chemical plants, petrochemical plants, and/or refineries may include one or more pieces of equipment that process one or more input chemicals to create one or more products. For example, catalytic dehydrogenation can be used to convert paraffins to the corresponding olefin, e.g., propane to propene, or butane to butene. All or portions of the plant may be configured to monitor operational data of the plant. For example, one or more sensors may be installed on the plant to monitor a flow rate through a pipe, an amount of vibration, a temperature, or the like. Other devices may be configured to monitor plant output (e.g., the quantity and quantity of a product gas). Still other devices may be configured to monitor other plant operational data, such as the presence and actions taken by plant engineers, ambient conditions, the physical or computer security of computing devices at the plant, or the like.

A "plant" can refer to any of various types of chemical and petrochemical manufacturing or refining facilities. References herein to plant "operators" are to be understood to refer to and/or include, without limitation, plant planners, managers, engineers, technicians, and others interested in, overseeing, and/or running the daily operations at a plant.

Figure 1A:
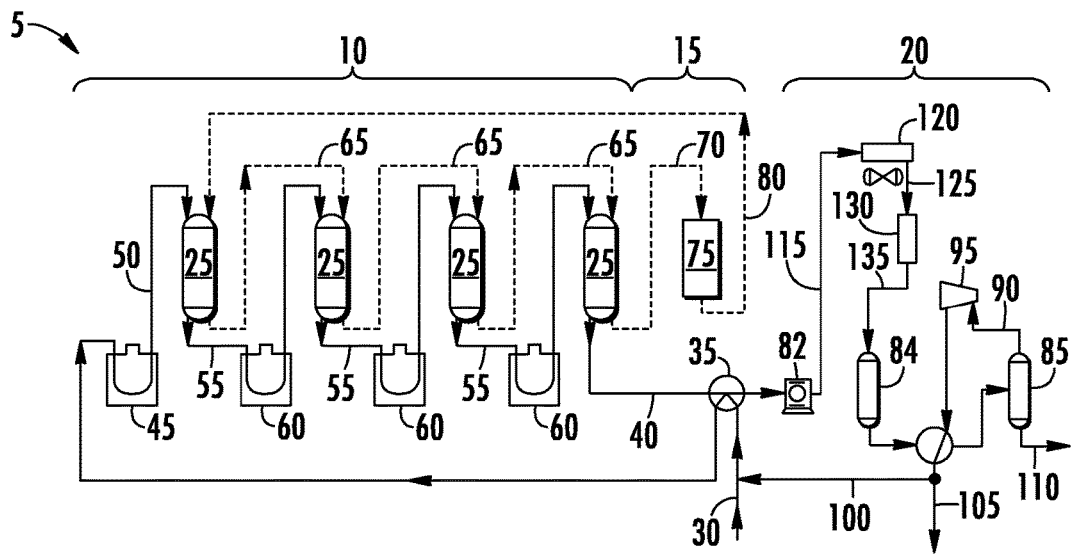
FIG. 1A shows an example system implementing a catalytic dehydrogenation process in accordance with one or more example embodiments.

FIG. 1A shows an example system 5 implementing a catalytic dehydrogenation process. The system 5 includes a reactor section 10, a catalyst regeneration section 15, and a product recovery section 20.

The reactor section 10 includes one or more reactors 25. A hydrocarbon feed 30 is sent to a heat exchanger 35 where it exchanges heat with a reactor effluent 40 to raise the feed temperature. The feed 30 is sent to a preheater 45 where it is heated to the desired inlet temperature. The preheated feed 50 is sent from the preheater 45 to the first reactor 25. Because the dehydrogenation reaction is endothermic, the temperature of the effluent 55 from the first reactor 25 is less than the temperature of the preheated feed 50. The effluent 55 is sent to interstage heaters 60 to raise the temperature to the desired inlet temperature for the next reactor 25.

After the last reactor, the reactor effluent 40 is sent to the heat exchanger 35, and heat is exchanged with the feed 30. The reactor effluent 40 is then sent to the product recovery section 20. The catalyst 65 moves through the series of reactors 25. When the catalyst 70 leaves the last reactor 25, it is sent to the catalyst regeneration section 15. The catalyst regeneration section 15 includes a regenerator 75 where coke on the catalyst is burned off and the catalyst may go through a reconditioning step. A regenerated catalyst 80 is sent back to the first reactor 25.

The reactor effluent 40 is compressed in the compressor or centrifugal compressor 82. The compressed effluent 115 is introduced to a cooler 120, for instance a heat exchanger. The cooler 120 lowers the temperature of the compressed effluent. The cooled effluent 125 (cooled product stream) is then introduced into a chloride remover 130, such as a chloride scavenging guard bed. The chloride remover 130 includes an adsorbent, which adsorbs chlorides from the cooled effluent 125 and provides a treated effluent 135. Treated effluent 135 is introduced to a drier 84.

The dried effluent is separated in separator 85. Gas 90 is expanded in expander 95 and separated into a recycle hydrogen stream 100 and a net separator gas stream 105. A liquid stream 110, which includes the olefin product and unconverted paraffin, is sent for further processing, where the desired olefin product is recovered and the unconverted paraffin is recycled to the dehydrogenation reactor 25.

Figure 1B:
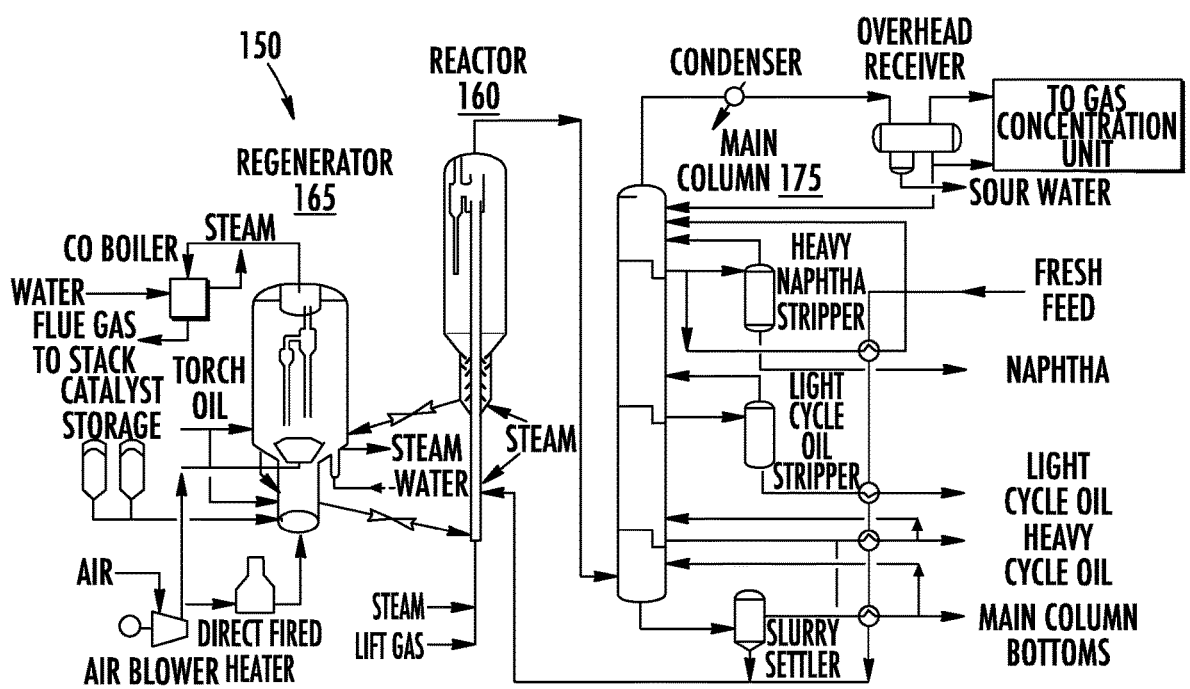
FIG. 1B shows an example system implementing a fluid catalytic cracking (FCC) process in accordance with one or more example embodiments.

FIG. 1B shows an example system 150 implementing a FCC process that includes an FCC fluidized bed reactor 160 and a spent catalyst regenerator 165. Regenerated cracking catalyst entering the reactor 160, from the spent catalyst regenerator 165, is contacted with an FCC feed stream in a riser section at the bottom of the FCC reactor 160, to catalytically crack the FCC feed stream and provide a product gas stream, comprising cracked hydrocarbons having a reduced molecular weight, on average, relative to the average molecular weight of feed hydrocarbons in the FCC feed stream.

As shown in FIG. 1B, steam and lift gas are used as carrier gases that upwardly entrain the regenerated catalyst in the riser section, as it contacts the FCC feed. In this riser section, heat from the catalyst vaporizes the FCC feed stream, and contact between the catalyst and the FCC feed causes cracking of this feed to lower molecular weight hydrocarbons, as both the catalyst and feed are transferred up the riser and into the reactor vessel. A product gas stream comprising the cracked (e.g., lower molecular weight) hydrocarbons is separated from spent cracking catalyst at or near the top of the reactor vessel, preferably using internal solid/vapor separation equipment, such as cyclone separators. This product gas stream, essentially free of spent cracking catalyst, then exits the reactor vessel through a product outlet line for further transport to the downstream product recovery section.

The spent or coked catalyst, following its disengagement or separation from the product gas stream, requires regeneration for further use. This coked catalyst first falls into a dense bed stripping section of the FCC reactor 160, into which steam is injected, through a nozzle and distributor, to purge any residual hydrocarbon vapors that would be detrimental to the operation of the regenerator. After this purging or stripping operation, the coked catalyst is fed by gravity to the catalyst regenerator through a spent catalyst standpipe. FIG. 1B depicts a spent catalyst regenerator 165, which can also be referred to as a combustor. Regenerators may have various configurations. In the spent catalyst regenerator 165, a stream of oxygen-containing gas, such as air, is introduced to contact the coked catalyst, burn coke deposited thereon, and provide regenerated catalyst, having most or all of its initial coke content converted to combustion products, including $CO_2$, CO, and $H_2O$ vapors that exit in a flue gas stream. The regenerator operates with catalyst and the oxygen-containing gas (e.g., air) flowing upwardly together in a combustor riser that is located within the catalyst regenerator. At or near the top of the regenerator, following combustion of the catalyst coke, regenerated cracking catalyst is separated from the flue gas using internal solid/vapor separation equipment (e.g., cyclones) to promote efficient disengagement between the solid and vapor phases.

In the FCC recovery section, the product gas stream exiting the FCC reactor 160 is fed to a bottoms section of an FCC main fractionation column 175. Several product fractions may be separated on the basis of their relative volatilities and recovered from this main fractionation column. Representative product fractions include, for example, naphtha (or FCC gasoline), light cycle oil, and heavy cycle oil.

Other petrochemical processes produce desirable products, such as turbine fuel, diesel fuel and other products referred to as middle distillates, as well as lower boiling hydrocarbon liquids, such as naphtha and gasoline, by hydrocracking a hydrocarbon feedstock derived from crude oil or heavy fractions thereof. Feedstocks most often subjected to hydrocracking are the gas oils and heavy gas oils recovered from crude oil by distillation.

Figure 2:
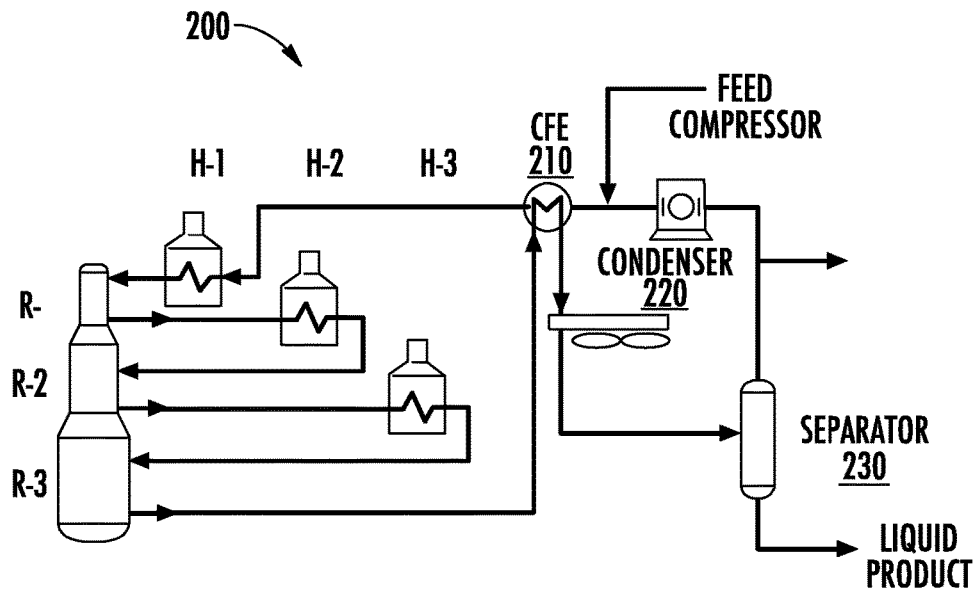
FIG. 2 depicts an illustrative system for implementing a catalytic reforming process using a (vertically-oriented) combined feed-effluent (CFE) exchanger in accordance with one or more example embodiments.

FIG. 2 shows an example of a system 200 implementing a process for reforming with continuous catalyst regeneration (CCR) using a (vertically oriented) combined feed-effluent (CFE) exchanger 210. The cold stream, a combination of liquid feed (110.4° C.) with hydrogen rich recycle gas (e.g., light paraffins) (125.8° C.), is introduced into a CFE exchanger 210 where the feed is vaporized. (e.g., Entrance temperature: 96.9° C.; Exit temperature: 499.6° C.) The feed/recycle exits the CFE as a gas and goes through a series of heating and reaction steps. The resulting product effluent or hot stream is introduced into the CFE exchanger 210 and is cooled down. (e.g., Entrance temperature: 527.9° C.; Exit temperature: 109.1° C.) The effluent exits the CFE exchanger 210 and is then cooled down further and condensed using an air cooler 220. The liquid product is separated from the gas stream containing hydrogen and light paraffins. Some of the gas stream is removed, for example as a product, and the rest of the stream is used as recycle gas.

Figure 3:
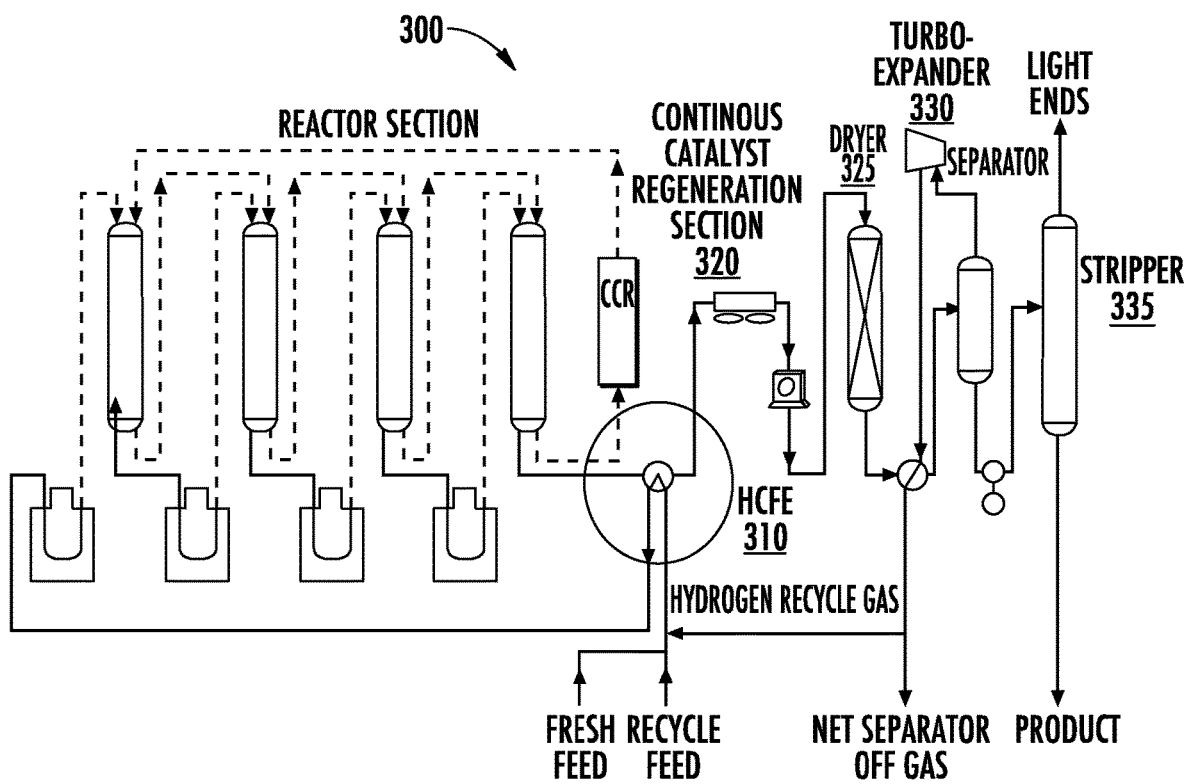
FIG. 3 depicts an illustrative system for implementing a catalytic dehydrogenation process (e.g., OLEFLEX) with continuous catalyst regeneration (CCR) using a (vertically-oriented) hot combined feed-effluent (HCFE) exchanger in accordance with one or more example embodiments.

FIG. 3 shows an illustrative system 300 for implementing a catalytic dehydrogenation process (e.g., an OLEFLEX process) with continuous catalyst regeneration (CCR) using a (vertically-oriented) hot combined feed-effluent (HCFE) exchanger 310. The cold stream, a combination of vapor feed with hydrogen rich recycle gas, is introduced into a HCFE exchanger and is heated. (e.g., Entrance temperature: 39.7° C.; Exit temperature: 533.7° C.) The feed/recycle exits the HCFE as a gas and goes through a series of heating and reaction steps. The resulting product effluent or hot stream is introduced into the HCFE exchanger three time and is cooled down. (e.g., Entrance temperature: 583.7° C.; Exit temperature: 142.3° C.) The effluent exits the HCFE exchanger and is then cooled down further using an air cooler 320. The effluent then passes through a dryer 325, separators 330, and strippers 335. Hydrogen recycle gas is separated after the dryer 325 and returned to the feed stream.

Analysis of Plant Operational Data

Figure 4A:
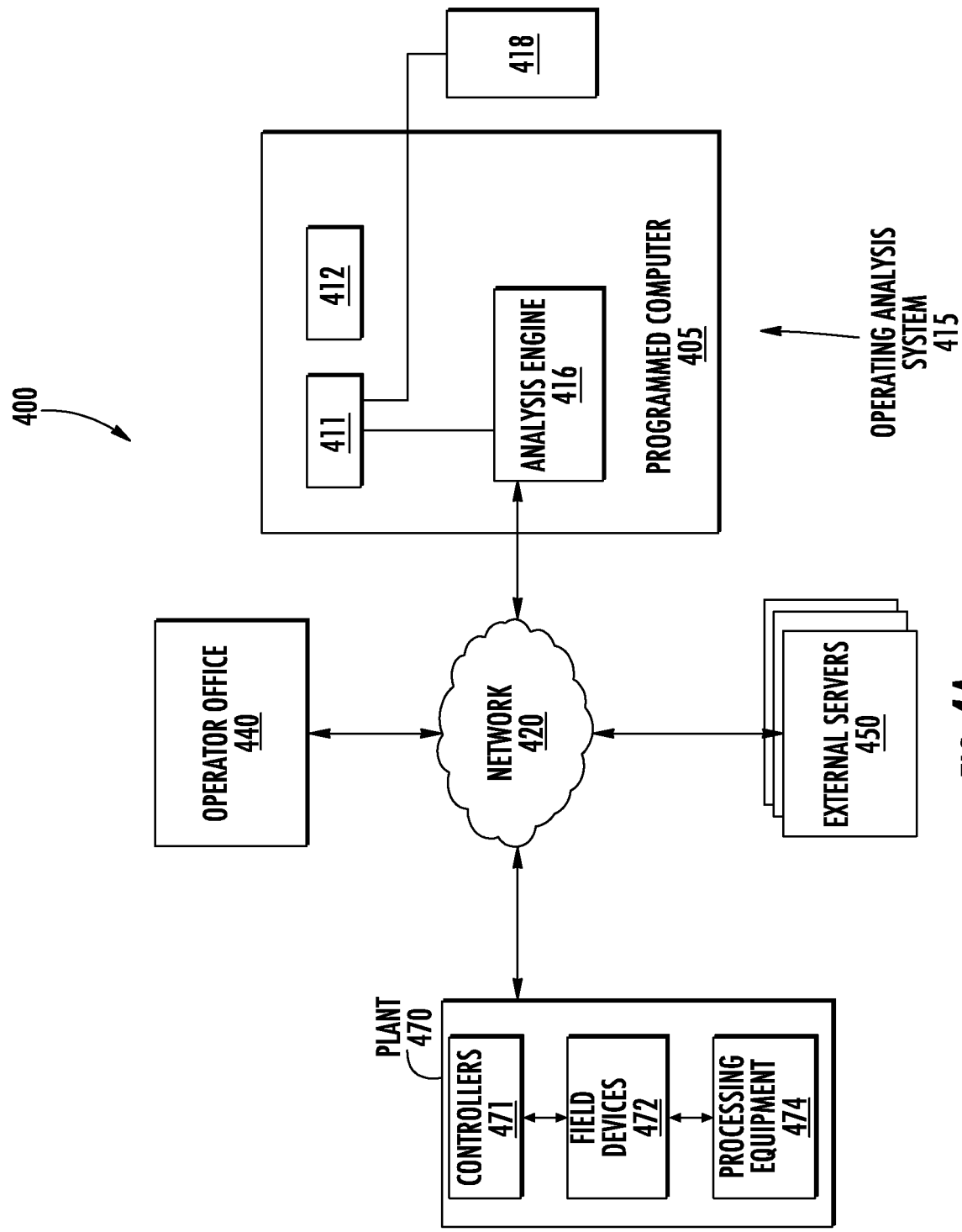
FIG. 4A shows an example network diagram including a disclosed computing system including an analysis engine.

FIG. 4A shows an example network diagram 400 comprising a disclosed computing system 410 including an analysis engine 416. The computing system 410 includes at least one processor 411 having an associated memory 412, and a display device 418. The analysis engine 416 may be connected, via a network 420, such as by an ethernet network, to a plant 470, an operator office 440, and external servers 450. The plant 470 may, for example, be configured as the system 5 implementing the catalytic dehydrogenation process of FIG. 1A, the system 150 implementing the fluid catalytic cracking process shown in FIG. 1B, and/or the system 200 and 300 implementing the respective processes shown in FIGS. 2 and 3. Though depicted as separate entities, the computing system 410, the plant 470, the operator office 440, and the external servers 450 may all be in the same location or similar locations. For generality, the plant 470 is shown including controllers for 471 coupled to field devices for 472 that comprise sensors and actuators that are coupled to processing equipment for 474. The plant 470 can be configured to generate at least one tangible product, or comprise other plant types, such as a power application based on implementing wind power or implementing solar power.

The computing system 410 generally comprises one or more computing devices, such as one or more servers (e.g., a cloud computing platform) configured to receive operational data and to determine one or more tasks. The analysis engine 416 may be configured to receive, from one or more sensors or platforms associated with the plant 470, operational data, such as sensor measurements. The analysis engine 416 may be configured to process the received operational data, such as by performing error detecting routines, organizing the operational data, reconciling the operational data with a template or standard, and/or to store the received operational data. Based on the operational data, the analysis engine 416 may be configured to determine one or more tasks.

Though the computing system 410 implementing the analysis engine 416 is depicted as a single computing system in FIG. 4A, the computing system implementing the analysis engine 416 may be a distributed network of computing devices located in a plurality of different locations. The analysis engine 416 as shown may comprise instructions stored in memory 412 and executed by one or more processors 411. For example, the analysis engine 416 may comprise an executable file. As another example, as shown in FIG. 4A the analysis engine 416 may implemented by a computing system 410 having one or more processors 411 and memory 412 storing instructions that, when executed by the one or more processors, performs functions described herein.

The analysis engine 416 processes and/or analyzes operational data. For example, the analysis engine 416 may be configured to execute code that compares operational data to threshold values and/or predetermined ranges. Machine learning algorithms may be used to process and/or interpret the operational data. For example, the analysis engine 416 may store and use historical operational data to teach a machine-learning algorithm acceptable ranges for operational data, and new operational data may be input into the machine learning algorithm to determine if an undesirable plant condition exists. Manual review by experts may be performed to process and/or interpret the operational data. For example, a certain range operational data (e.g., unexpectedly high temperature values) may involve manual review by an expert (e.g., a plant employee) using a user interface coupled to a computing device associated with the analysis engine 416.

The network 420 may be a public network, a private network, or a combination thereof that communicatively couples the analysis engine 416 to other devices. Communications between devices such as the computing devices of the plant 470 and the analysis engine 416, may be packetized or otherwise formatted in accordance with any appropriate communications protocol. For example, the network 420 may comprise a network configured to use Internet Protocol (IP). The communications may be encrypted.

The plant 470 may be any of various types of chemical and petrochemical manufacturing or refining facilities. The plant 470 may be configured with one or more computing devices that monitor plant operational data and report such operational data to the analysis engine 416. The plant 470 may comprise sensors that report operational data to the analysis engine 416 via the network 420. The plant 470 may additionally or alternatively conduct tests (e.g., lab tests), which may be sent as operational data to the analysis engine 416. For example, operational data may relate to the pH or viscosity of liquids, the temperature of liquids, gasses, or solids (e.g., the temperature of a burner or an inlet valve), the molecular consistency of a substance, the color of a substance, the amount of power used (e.g., by a machine), or the like. Such reporting of operational data may occur on a periodic basis (e.g., every ten seconds, every hour, for each plant cycle).

The operator office 440 may be configured to, via one or more computing devices in the operator office 440, receive and/or send operational data to the analysis engine 416, configure the plant 470, and/or communicate with and configure the analysis engine 416. Operational data may originate from both the plant 470 and the operator office 440. For example, operational data such as one or more safety warnings and/or alerts may be transmitted from the operator office 440 to the analysis engine 416.

The external servers 450 may include memory to be configured to store operational data and/or information used to determine operational data. For example, the external servers 450 may store information relating to an average flow rate of a nozzle, which may be compared with an actual flow rate of a nozzle at the plant 470.

Figure 4B:
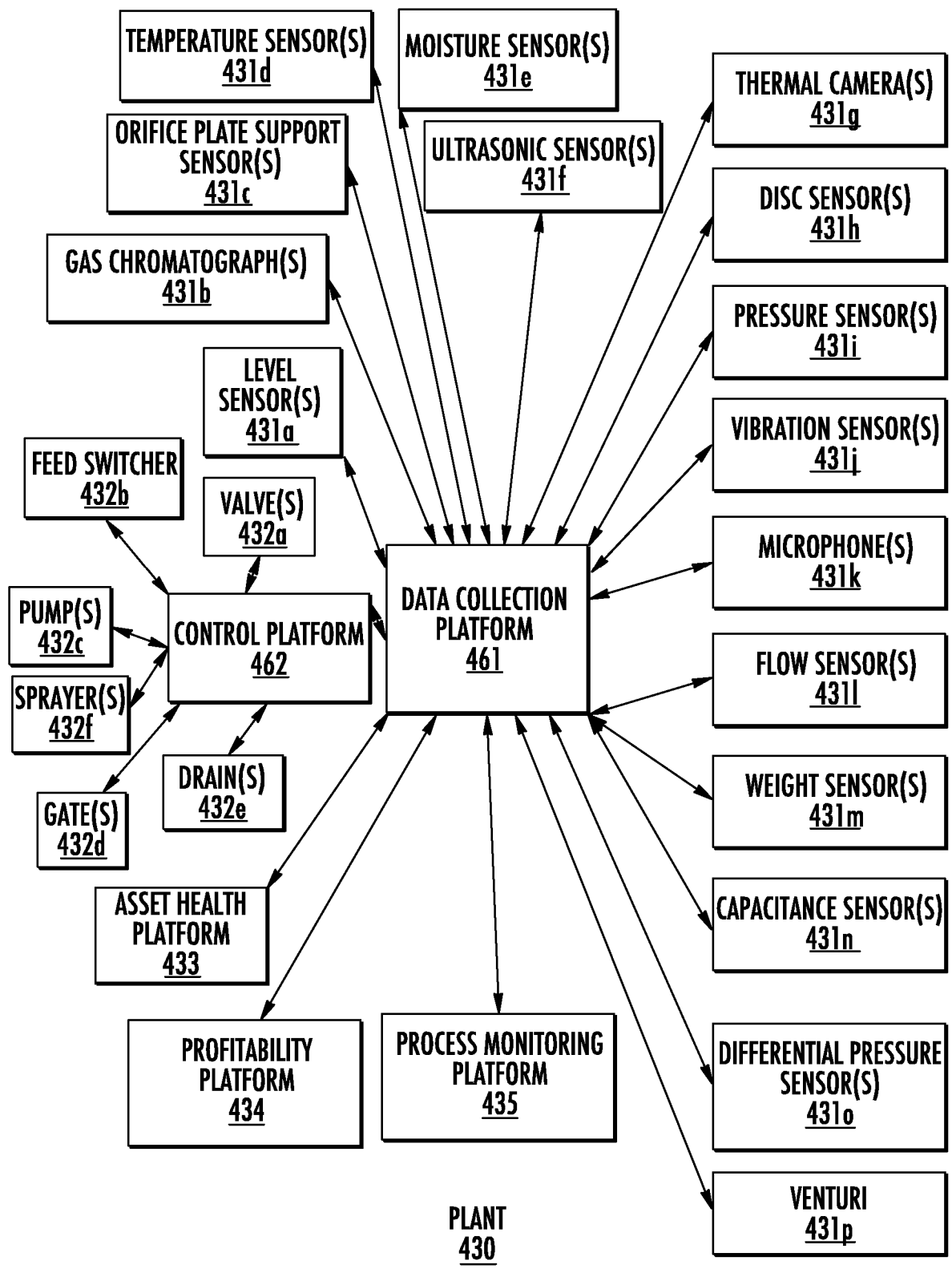
FIG. 4B shows an example plant with various operational data collecting platforms.

FIG. 4B shows an illustrative example of the plant 470 comprising a data collection platform 461 connected to a control platform 462, an asset health platform 433, a profitability platform 434, and a process monitoring platform 435. The data collection platform 461 is connected to sensors 431$a$-$p$. The control platform 462 is connected to controllable devices 432$a$-$f$. The sensors 431$a$-$p$ and controllable devices 432$a$-$f$ depicted in FIG. 4B are examples, and any number or type of sensors and/or controllable devices may be implemented, whether or not connected to the data collection platform 461 or the control platform 462. Though the sensors and controllable devices depicted in FIG. 4B are shown as connected to the data collection platform 461 and the control platform 462, other platforms, such as the asset health platform 433, may receive data from the sensors and/or controllable devices.

The data collection platform 461 may be configured to collect operational data from one or more sensors and/or controllable devices and transmit that information, e.g., to the analysis engine 416. Such sensors 431$a$-$p$ may comprise, for example, level sensors 431$a$, gas chromatographs 431$b$, orifice plate support sensors 431$c$, temperature sensors 431$d$, moisture sensors 431e, ultrasonic sensors 431f, thermal cameras 431g, disc sensors 431h, pressure sensors 431i, vibration sensors 431j, microphones 431k, flow sensors 431l, weight sensors 431m, capacitance sensors 431n, differential pressure sensors 431o, and/or venturi 431p. The data collection platform may additionally or alternatively be communicatively coupled to the control platform 462 such that, for example, the data collection platform 461 may receive, from the control platform 462 and/or any of the controllable devices 432a-f, additional operational data corresponding to control of the plant 470. The controllable devices 432a-f may comprise, for example, valves 432a, feed switchers 432b, pumps 432c, gates 432d, drains 432e, and/or sprayers 432f.

The asset health platform 433 may be configured to collect information about the health of various plant assets, such as equipment. For example, the asset health platform 433 may monitor wear and tear on a periodically replaced component in a plant, such as a nozzle. The asset health platform 433 may be connected to one or more sensors on plant assets and/or may estimate asset health based on, for example, a depreciation schedule. The asset health platform 433 may be configured to receive, e.g., from the operator office 440, information about asset health. For example, an engineer may transmit, using a computing device, results of an equipment inspection to the asset health platform 433.

The process monitoring platform 435 may be configured to, based on information received from one or more sensors, determine operational data corresponding to processes (e.g., the chemical reactions required to produce a product gas) in the plant. For example, the process monitoring platform 435 may be configured to determine, based on other operational data, whether a catalyst should be replaced. As another example, the process monitoring platform 435 may be configured to determine that the actual production of a plant is less than a projected production of the plant.

The profitability platform 434 may be configured to monitor plant variables corresponding to profit and loss. For example, the profitability platform may be configured to determine, based on the cost of plant operations and plant yield, an estimated profit per hour. The profit may be represented as, e.g., a currency value. The profit may be estimated based on, for example, a market value of a product gas.

Figure 4C:
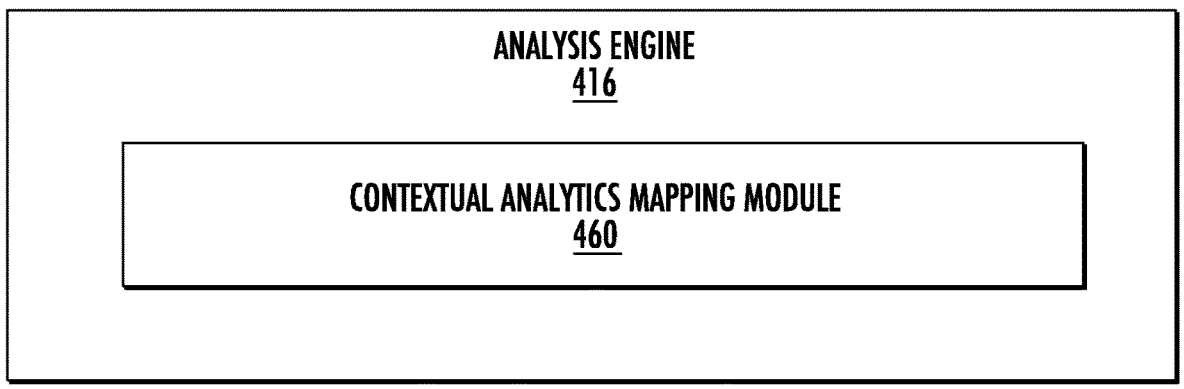
FIG. 4C shows an example analysis engine including a contextual analytics mapping module.

FIG. 4C depicts an illustrative example of an analytics engine 416, which may include a contextual analytics mapping module 460. A contextual analytics mapping module may be configured to visually link current situations such as process issues, asset issues, and associated recommendations within a single user interface, generally by utilizing the underlying fault tree, and map these to the recommended actions to rectify the situation.

A contextual analytics mapping module 460 may use a fault tree that stores information regarding relationships between process issues, asset issues, and associated recommendations. A fault tree may be generated when designing a plant and planning underlying models for a plant. The fault tree may map out potential causes for, e.g., loss of reformate production. An asset might be a potential failure mode for reformate production dropping. A fault tree or model may map some or all ways that an asset might have faults. The fault tree may link process and asset recommendations together.

In one or more embodiments, artificial intelligence (e.g., a neural network) may be used to build or to update a fault tree. Artificial intelligence may be used instead or as a supplement to a fault tree. The artificial intelligence may be trained based on what happened previously to the equipment or in the plant. The artificial intelligence may use ongoing data (e.g., operational data) to update one or more elements of, e.g., the fault tree. For example, if every time a particular asset has a problem, reformate production goes down, the artificial intelligence may determine that there is a relationship between the particular asset and reformate production. The artificial intelligence may revise, add, or remove process issues, asset issues, or recommendations.

The analysis engine (e.g., contextual analytics mapping module 460) may generate one or more visual indicators of which asset issues may be impacting a process, and vice versa. The analysis engine may provide a single interface that allows even inexperienced users to instantly identify the relationship between key process and asset parameters. The interface may identify the related recommendations from both process and assets, guiding a user toward a better course of action.

A visualization may depict a relationship between asset issues and proposed changes to address a particular asset issue specifically. For example, if a fouled heat exchanger impacts production, the visualization may show a drop in production due to a compressor fault. The visualization may also show one or more recommendations regarding how to resolve issue.

The contextual analytics mapping module 460 may further one or more recommendations, and link those recommendations to process and/or asset issues. The contextual analytics mapping module 460 may allow for grouping one or more process and/or asset issues. The contextual analytics mapping module 460 may determine one or more recommendations for resolving one or more groups of process and/or asset issues.

Figure 5:
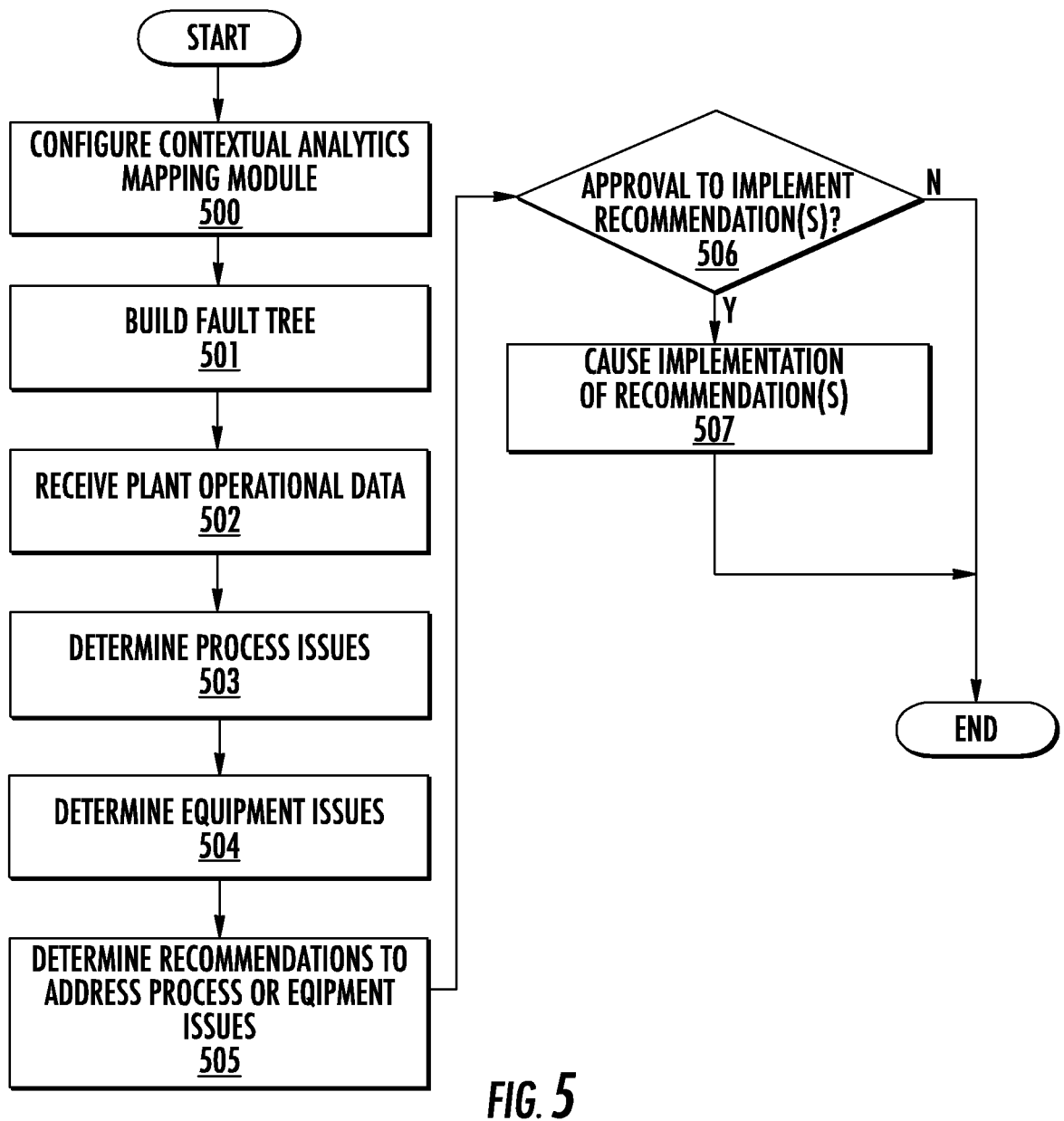
FIG. 5 is a flow chart of a method of disclosed contextual analytics mapping that may be performed by a disclosed analysis engine.

FIG. 5 shows a flow chart of an example method of contextual analysis mapping that may be performed by a disclosed analysis engine. In step 500, the contextual analytics mapping module and/or the analysis engine may be configured. The analysis engine may be configured to collect operational data, e.g., at a predetermined rate or at predetermined times. The analysis engine may be configured with a threshold task importance, e.g., such that tasks assigned an importance value below the threshold are not acted upon. The analysis engine may be configured with baseline measurements or values, such as default temperatures for each of specific processing equipment in a particular plant. The analysis engine may be configured with a model of a plant such that the analysis engine may compare operational data received to model plant measurements. The analysis engine may be configured with one or more rules for how tasks may be implemented.

In step 501, a fault tree is be built. The fault tree maps out potential causes for loss, such as loss of reformate production, for example due to process issues or asset issues.

In step 502, operational data is received. Operational data may generally come from any of the sources associated with the plant, such as the data collection platform 461, the control platform 462, the asset health platform 433, the profitability platform 434, and/or the process monitoring platform 435, and/or any of the sensors or devices associated with the plant, such as those depicted in FIG. 4B.

Operational data may comprise one or more alerts or warnings. An alert and/or warning may correspond to one or more problems corresponding to the plant. For example, an alert may indicate that a burner is no longer working. As another example, a warning may indicate that a burner is receiving an unexpectedly low quantity of fuel, and that the heat of the burner is dropping. Operational data may comprise warnings or alerts that are related and/or inconsistent. For example, one alert may indicate that the temperature of a burner is dropping, whereas another alert may indicate that the temperature of a substance heated by the burner is increasing. An alert and/or warning may correspond to a projected problem, e.g., a problem that has not yet occurred but that may occur in the future. For example, if a temperature of a substance is increasing rapidly, the present temperature of the substance may be tolerable, but a projected temperature of the substance in ten minutes may be undesirable.

Operational data may comprise information that may indicate symptoms of alerts or warnings. For example, an alert may indicate that a burner is no longer active, and operational data may indicate whether fuel is being sent to the burner. As another example, operational data may comprise information indicating a reliability or importance of an alert and/or warning. For example, operational data may comprise diagnostic information for a sensor, such that a reliability of sensor measurements may be determined.

Operational data may comprise plant production information. Plant production information may comprise any information relating to the production of a product by the plant, e.g., through chemical processes. Plant production information may comprise a warning and/or alert indicating that product yield has dropped, that a catalyst should be replaced, or the like. Plant production information may relate to chemical and/or mechanical aspects of plant production.

Operational data may comprise asset health and/or status. Asset health and/or status may comprise any information corresponding to a plant asset, such as an amount of wear, depreciation, whether or not the plant asset is in use, whether the plant asset is being used in an unintended manner, or the like. Asset health and/or status may comprise a warning and/or alert indicating that an asset is worn, broken, unreliable, or otherwise requiring maintenance. Asset health and/or status may comprise an indication of an operating status of a particular asset, such as a flow rate of a nozzle, a heat of a burner, or an amount of vibration of a particular asset. For example, asset health and/or status may comprise a warning and/or alert that an amount of vibration of a particular asset (e.g., a pipe) has exceeded a threshold.

Operational data may also comprise profitability information. Profitability information may comprise any information relating to profit of a plant, such as a dollar figure per hour, a ratio of costs versus the estimated value of product produced, or the like. For example, profitability information may comprise an indication of the cost of plant operations, including raw materials, as compared to the market value of a product gas. As another example, profitability information may comprise a warning and/or alert that profitability has dropped below a predetermined threshold.

Operational data may also comprise workforce information. Workforce information may comprise any information relating to human effort at the plant, including the presence or absence of employees, current work efforts by employees, or the like. For example, the workforce information may comprise a warning and/or alert that an engineer is not monitoring a particular aspect of a plant. Such a warning and/or alert may be automatically determined, for example, by comparing a task list for the engineer with a list of tasks marked or determined as completed. If the system determines that a task that was supposed to have been performed has not been completed (e.g., by determining that the task was not marked as completed, or by determining based on one or more measurements that the task was not completed), the system may determine that the engineer is not monitoring the particular aspect of the plant.

Operational data may comprise automation system and/or control information. Automation system and/or control information may comprise any information about systems used to control and/or automate all or portions of a plant. For example, automation system and/or control information may comprise a warning and/or alert that a control system is no longer functioning or has input values which exceed a predetermined threshold.

Operational data may comprise safety information. Safety information may comprise any information associated with the safe operation of a plant. For example, the safety information may comprise a warning and/or alert that occupational safety standards have been exceeded, that atmospheric conditions of a plant are unsafe for human presence (e.g., because a quantity of a particular substance (e.g., carbon monoxide in the air) exceeds a threshold), or the like.

Operational data may comprise cybersecurity information. Cybersecurity information may comprise information associated with the security of devices, such as computing devices, associated with the plant. For example, cybersecurity information may comprise a warning and/or alert that software on a device is out of date or insecure. The system may determine a version of the software on the device, connect to a server to determine a most current version of the software on the device, and compare the most current version to the version of the software on the device to determine whether the software on the device is out of date.

In step 503, process issues are determined. Operational data may be analyzed to determine correlations between different portions of the operational data. For example, reduced flow rate of fuel to a burner, dropping burner temperature, and the malfunction of a fuel tank may be correlated as all related to the malfunction of the fuel tank. As another example, undesirable vibrations in pipes and an imbalance in a motor located nearby those pipes may be correlated, as the motor may be vibrating the pipes. As yet another example, a malfunction in a computing device in the plant may be correlated with a determination that software on the computing device has not been upgraded in a certain period of time (e.g., years).

Analysis of operational data may comprise the use of a model of the plant. All or portions of the operational data may be used to model the plant, e.g., using a software simulation, and simulated plant values may be compared to actual values in the operational data. For example, portions of operational data assigned high confidence values may be used in a software model, and simulated values from the software model may be compared to portions of the operational data assigned low confidence values.

In step 504, equipment issues are determined. In step 505, recommendations to address process issues or equipment issues are determined, which may be determined based on the analysis of the operational data. A recommendation may include one or more tasks, which may correspond to one or more actions performed with respect to the plant. A task may be modifying one or more plant parameters (e.g., a burner temperature) of a plant, adding, modifying, or removing plant assets, or the like. For example, a task may be to replace a burner, alter the fuel flow to a burner, or to clean a burner. As another example, a task may be to add or remove a reactor. The task may comprise taking all or portions of the plant offline and/or shutting down the plant.

Tasks may be determined to remediate one or more warnings and/or alerts in the operational data. Tasks may be prioritized. For example, tasks that address multiple warnings and/or alerts may be selected instead of or in addition to tasks that address only one warning and/or alert. Tasks may be assigned importance and/or confidence values based on the importance and/or confidence values assigned to all or portions of the operational data. Not all possible tasks need be determined. For example, only tasks associated with all or portions of operational data having a sufficiently high importance and/or confidence value may be determined.

In step 506, it may be determined whether approval has been received to implement one or more recommendations. The approval can be granted automatically, or involve one or more individuals. In step 507, the recommendation(s) may be implemented.

Task requirements may be requirements associated with one or more actions associated with a task. For example, adjusting the flow rate of fuel to a burner may require human interaction (e.g., that a specific engineer walk to and turn a knob), or may require one or more instructions to other devices (e.g., that a particular computing device receive instructions specifying a new flow rate for the burner). One or more actions may comprise receiving authorization and/or approval, e.g., from a supervisor. While one task may require involvement by a first set of individuals (e.g., engineers physically at a plant), another task may require involvement by a different set of individuals (e.g., administrators not physically at the plant). A task may be automatically resolved by one or more devices (e.g., automatically adjusting the knob, automatically adjusting the flow rate to the burner). Thus, one or more tasks may be assigned for a computing system or platform to complete. A task need not solve a problem, but may be a task associated with diagnosing a problem that is detected.

Causing implementation of a task may comprise displaying, e.g., on one or more computing devices, an indication of the task and necessary actions to complete the task. For example, the task, an importance and/or confidence level associated with the task, and actions required to complete the task may be shown in a graphical dashboard on a display of a computing device. Such a display may prompt specific individuals to perform one or more actions. For example, one display for an engineer may display one action associated with the task, and a different display for a different engineer may display a different action associated with the same task. The display may include a prompt for permission to automatically take an action associated with the task. Causing implementation of a task may comprise transmitting, e.g., to a computing device in the plant, instructions which cause one or more actions associated with the task to be performed. For example, a computing device managing an air blower may be instructed by the computing device to speed up or slow down the blower.

Implementation of one or more actions corresponding to the task may be tracked, such that completion of the task may be monitored. For example, one or more tasks may be stored, and a completion status of one or more actions associated with the task may be tracked. Completion of a task may be determined after receiving, from a user device (e.g., a mobile device, an augmented-reality headset) of an engineer assigned to the task, confirmation of completion of the task. Alternatively or additionally, one or more operational data values may be used to determine the completion of the task (e.g., if the task was to increase a fuel flow to the burner, and the flow to the burner has increased by more than a threshold amount, then the system may determine that the task was completed).

Figure 6A:
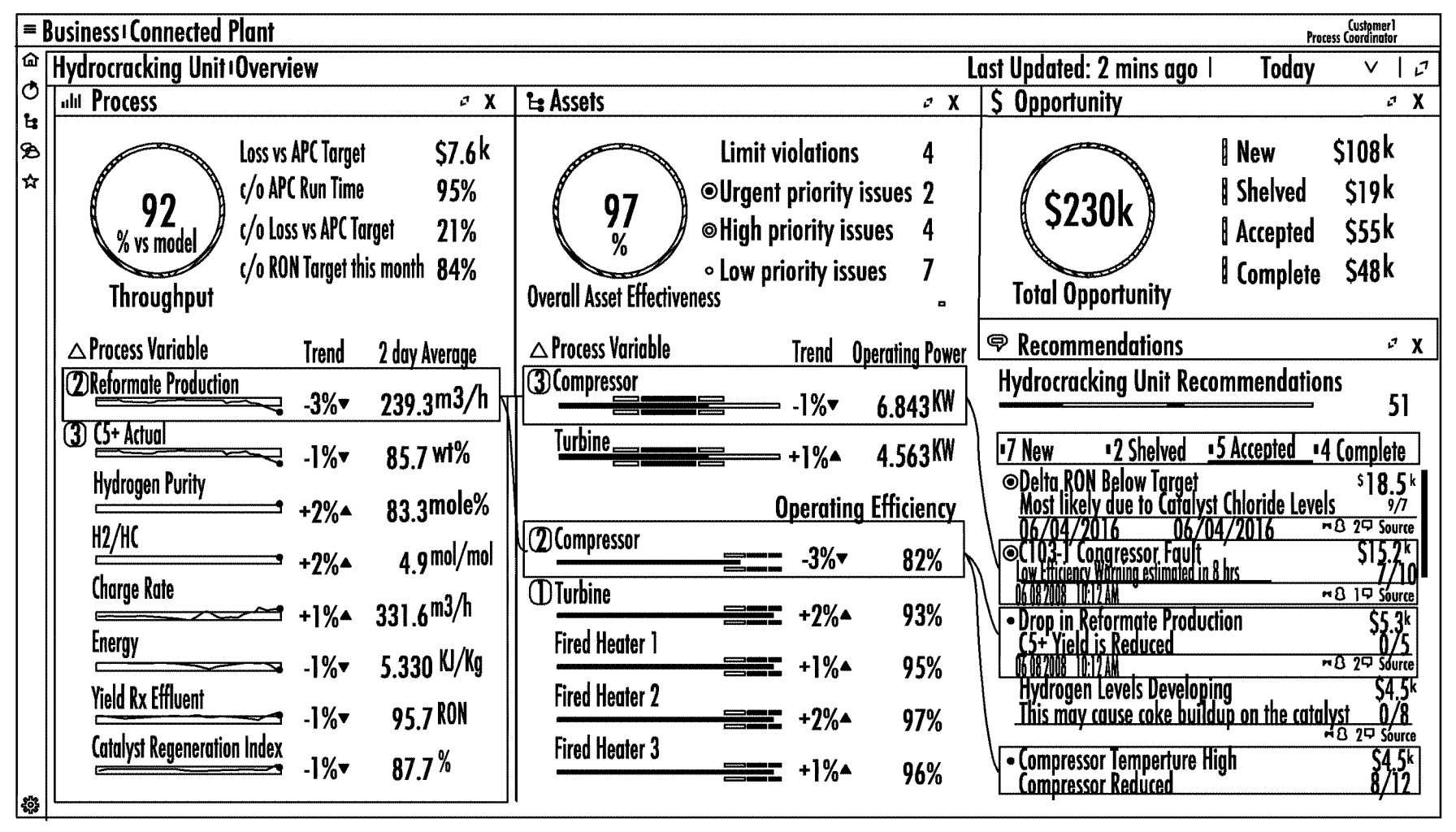

FIG. 6A depicts an illustrative graphical user interface 600 that may include one or more visualizations depicting one or more process issues, asset issues, and/or recommendations related to the process issues and/or asset issues.

The graphical user interface 600 may include one or more columns. For example, the graphical user interface may include a first column, a second column, and/or a third column. The first column may include one or more process issues. The second column may include one or more asset issues. The third column may include one or more recommendations for resolving one or more process issues and/or one or more asset issues. The graphical user interface 600 may visually depict one or more links between the process issues, asset issues, and/or recommendations.

The graphical user interface may depict a most important process issue at the top of the column of process issues. The graphical user interface may depict a most important asset issue at the top of the column of asset issues. The graphical user interface may depict a most important recommendation at the top of the column of recommendations. The most important process issue, asset issue, and/or recommendation may be determined based on one or more factors, and may change over time (e.g., in real time) based on current operation data received regarding a plant. Illustrative examples of the one or more factors for determining the ordering of the one or more columns may include an impact on a production of the plant, an impact on an efficiency of the plant, an impact on a projected operating life of the plant, an impact on a profit or loss of the plant, an impact on one or more other assets or processes of the plant, or the like. A process or asset might be having an issue that is seemingly small (e.g., is only operating slightly out of bounds), but that has a large impact on a combination of variables, while a different process or asset might be having an issue that is seemingly large (e.g., is operating far out of bounds), but that has only a small impact on the combination of variables, and therefore the process or asset that is only slightly out of bounds might be shown higher in the column relative to the process or asset that is operating far out of bounds.

The graphical user interface may include one or more indications of a health of a process or asset. For example, a visualization related to a process or asset may display a first color to indicate a first health level, a second color to indicate a second health level, a third color to indicate a third health level, and the like. For example, if a process or asset is operating smoothly and within normal operating thresholds, the visualization may show a first color in connection with the process or asset. If the process or asset has a minor issue (e.g., between a first threshold and a second threshold), the visualization may show a second color in connection with the process or asset. If the process or asset has a major issue (e.g., out of bounds beyond the second threshold), the visualization may show a third color in connection with the process or asset. Thus, one or more elements (e.g., color) of the visualization may indicate whether a process or asset is running smoothly (e.g., a within normal operating threshold).

In one or more embodiments, the graphical user interface may be configured to receive an input selecting one or more visualizations related to a process, an asset, and/or a recommendation. After receiving the input selecting the one or more visualizations, the graphical user interface may filter and show only other visualizations related to the selected visualization. For example, if a process visualization is selected, the graphical user interface may filter process visualizations, asset visualizations, and recommendation visualizations such that only process visualizations, asset visualizations, and recommendation visualizations related to the selected process visualization are displayed. As another example, if an asset visualization is selected, the graphical user interface may filter process visualizations, asset visualizations, and recommendation visualizations such that only process visualizations, asset visualizations, and recommendation visualizations related to the selected asset visualization are displayed. As a further example, if a recommendation visualization is selected, the graphical user interface may filter process visualizations, asset visualizations, and recommendation visualizations such that only process visualizations, asset visualizations, and recommendation visualizations related to the selected recommendation visualization are displayed. Thus, the graphical user interface may filter lists of recommendations, processes, and assets to display recommendations, processes, and assets that are related to a selected recommendation, process, or asset.

In one or more embodiments, there might only be recommendations related to an asset or related to a process, rather than both. For example, it may be the case that an asset is not having a problem, and a process is being impacted by something other than an asset (e.g., could be that catalyst needs to be refreshed). Accordingly, the system may determine that there is a linked relationship between the process and a recommendation, without a linked relationship to an asset.

Figure 6B:
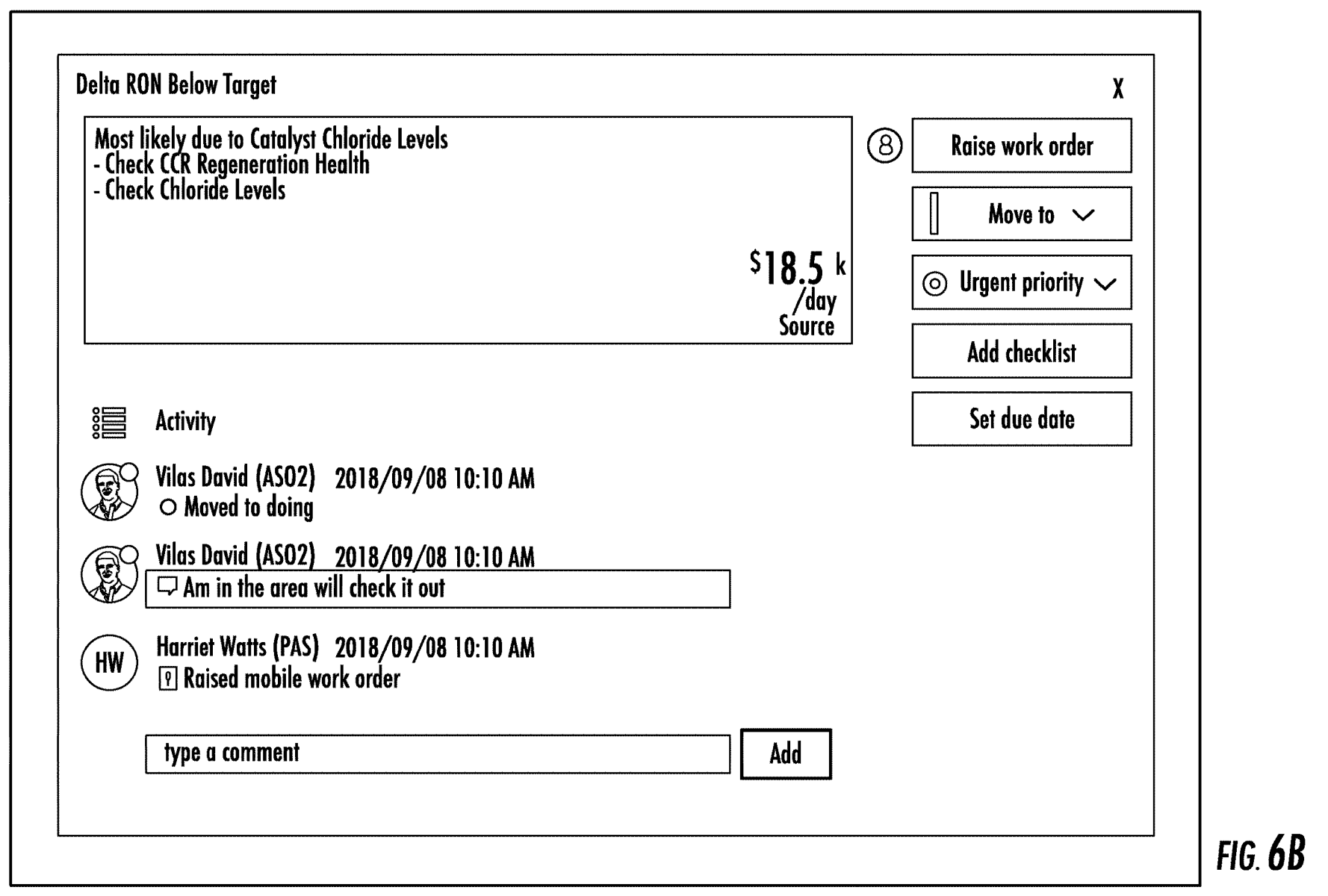

FIG. 6B depicts an example graphical user interface that may be shown in response to a selection of one or more process issue visualizations, asset issue visualizations, or recommendation visualizations. For example, if a recommendation is selected, the graphical user interface of FIG. 6B may be displayed as a pop-up window.

The graphical user interface may show more details, assign responsibility, and/or track progress towards completion. The graphical user interface may receive input setting a priority level for this recommendation.

The graphical user interface may enable users to enter comments to capture what worked and what didn't in one or more instances. Then, in the future, if a similar situation occurs again in the future, these past comments can be recalled, reviewed, and used as a plant-specific recommended action based on past experiences.

The graphical user interface may allow creation of a work order for a manual fix. The analytics engine may generate and send a push notification to e.g., a mobile device, an augmented reality headset, or the like. The graphical user interface may receive input approving an automated fix, and the system may automatically implement the change. For example, the system may receive input indicating user approval of a recommended change (e.g., to a pressure, a flow, a temperature), then after receiving the user approval, the system may automatically cause the recommended change.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

The invention claimed is:

1. A method, comprising:
   a first computing system receiving operational data including process parameters generated by one or more sensors in a plant that includes controllers, and field devices comprising the sensors and actuators coupled to processing equipment, where the processing equipment is configured and controlled to run a controlled process, and
   using the operational data, providing at least one of:
      a first listing of worst performing ones of the process parameters based on a deviation from a model of the plant and excursions from limits of the model that when a selected poor performing one of the process parameters is chosen by a user from the first listing generates a ranked filtered view of equipment parameters for associated ones of the processing equipment that may be affected by the selected poor performing process parameters along with a filtered view of first recommendations for aiding the user to recognize what action to do in order to fix at least one of the associated ones of the processing equipment and the selected poor performing process parameter;
      a second listing of worst performing ones of the processing equipment based on a second deviation from the model of the plant and second excursions from second limits of the model that when a selected poor performing one of the processing equipment is chosen by the user generates a ranked filtered view of suspected ones of the process parameters that may be affected by the selected poor performing processing equipment along with a filtered view of second recommendations for aiding the user to recognize what action to do in order to fix at least one of the selected poor performing processing equipment and the suspected ones of the process parameters.

2. The method of claim 1, wherein the first listing and the second listing both further comprise:
   a visualization on a display device associated with the first computing system of a monetary opportunity that addressing the selected poor performing one of the process parameters or the selected poor performing one of the processing equipment would save.

3. The method of claim 1, wherein the first recommendations and the second recommendations are both ranked recommendations based on the a combination of opportunity, priority and safety or risk for the plant.

4. The method of claim 3, further comprising:
   receiving approval to implement a selected recommendation comprising at least one of the first recommendations from the ranked recommendations of the first recommendations or a second recommendation from the rank recommendations of the second recommendations, and
   sending a command configured to cause a task to be performed for implementing the selected recommendation.

5. The method of claim 4, further comprising a user of the first computing system entering comments including the selected poor performing one of the process parameters or the selected poor performing one of the processing equipment, the task, and a perceived effectiveness of the task in solving the selected poor performing one of the process parameters or the selected poor performing one of the processing equipment.

6. The method of claim 1, wherein the operational data includes real-time data, and wherein the method is performed by the first computing system in real-time.

7. The method of claim 1, wherein the plant is configured to generate at least one tangible product or implement a power application.

8. The method of claim 1, wherein the first computing system includes a contextual analytics mapping module that utilizes a fault tree which stores cross-linking information regarding relationships between the first listing, the second listing, and associated ones of the first recommendations and the second recommendations.

9. A computing system, comprising:
a receiver for receiving operational data including process parameters generated by one or more sensors in a plant that includes controllers, and field devices comprising the sensors and actuators coupled to processing equipment, where the processing equipment is configured and controlled to run a controlled process;
the computing system has an analysis engine configured for using the operational data, for automatically providing:
a first listing of worst performing ones of the process parameters based on a deviation from a model of the plant and excursions from limits of the model that when a selected poor performing one of the process parameters is chosen by a user from the first listing generates a ranked filtered view of equipment parameters for associated ones of the processing equipment that may be affected by the selected poor performing process parameters along with a filtered view of first recommendations for aiding the user to recognize what action to do in order to fix at least one of the associated ones of the processing equipment and the selected poor performing process parameter;
a second listing of worst performing ones of the processing equipment based on a second deviation from the model of the plant and second excursions from second limits of the model that when a selected poor performing one of the processing equipment is chosen by the user generates a ranked filtered view of suspected ones of the process parameters that may be affected by the selected poor performing processing equipment along with a filtered view of second recommendations for aiding the user to recognize what action to do in order to fix the selected poor performing processing equipment and at least one of the suspected ones of the process parameters.

10. The computing system of claim 9, further comprising a display device, wherein the first listing and the second listing both further comprise:

a visualization on the display device of a monetary opportunity that addressing the selected poor performing one of the process parameters or the selected poor performing one of the processing equipment would save.

11. The computing system of claim 9, wherein the first recommendations and the second recommendations are both ranked recommendations that are based on a combination of opportunity, priority, and safety or risk for the plant.

12. The computing system of claim 11, wherein the analysis engine is configured for:
receiving approval to implement a selected recommendation comprising at least one of the first recommendations from the ranked recommendations of the first recommendations or a second recommendation from the rank recommendations of the second recommendations, and
sending a command configured to cause a task to be performed for implementing the selected recommendation.

13. The computing system of claim 12, wherein the computing system is configured for a user of the computing system entering comments including the selected poor performing one of the process parameters or the selected poor performing one of the processing equipment, the task, and a perceived effectiveness of the task in solving the selected poor performing one of the process parameters or the selected poor performing one of the processing equipment.

14. The computing system of claim 9, wherein the operational data includes real-time data, and wherein the computing device operates in real-time.

15. The computing system of claim 9, wherein, the plant is configured to generate at least one tangible product or implement a power application.

16. The computing system of claim 9, wherein the computing system includes a contextual analytics mapping module that utilizes a fault tree which stores cross-linking information regarding relationships between the first listing, the second listing, and associated ones of the first recommendations and the second recommendations.

* * * * *